US007032900B2

(12) United States Patent
Nishikata et al.

(10) Patent No.: US 7,032,900 B2
(45) **Date of Patent: *Apr. 25, 2006**

(54) DOCUMENT FEEDING APPARATUS, IMAGE READING APPARATUS AND IMAGE FORMING APPARATUS

(75) Inventors: Kazushi Nishikata, Shizuoka (JP); Hiroaki Namiki, Kanagawa (JP); Makoto Izumi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/028,559

(22) Filed: Jan. 5, 2005

(65) Prior Publication Data

US 2005/0152723 A1 Jul. 14, 2005

Related U.S. Application Data

(62) Division of application No. 10/347,874, filed on Jan. 22, 2003, now Pat. No. 6,877,742.

(30) Foreign Application Priority Data

Jan. 31, 2002 (JP) ............................ 2002/022959

(51) Int. Cl.
*B65H 5/06* (2006.01)

(52) U.S. Cl. ....................... 271/264; 358/498; 399/365

(58) Field of Classification Search ................ 271/264; 358/498; 399/365, 215, 377
See application file for complete search history.

(56) References Cited

U.S. PATENT DOCUMENTS

| | | | |
|---|---|---|---|
| 5,235,381 A | 8/1993 | Namiki et al. | 355/72 |
| 5,280,331 A | 1/1994 | Namiki | 355/318 |
| 5,651,540 A | 7/1997 | Watanabe et al. | 271/10.12 |
| 5,765,826 A | 6/1998 | Isoda et al. | 271/162 |
| 5,881,350 A | 3/1999 | Wada et al. | 399/367 |
| 6,179,287 B1 | 1/2001 | Watanabe et al. | 271/215 |

(Continued)

FOREIGN PATENT DOCUMENTS

| | | |
|---|---|---|
| JP | 7-42258 | 2/1995 |

(Continued)

*Primary Examiner*—Patrick Mackey
(74) *Attorney, Agent, or Firm*—Fitzpatrick, Cella, Harper & Scinto

(57) ABSTRACT

A document feeding apparatus in which the vibration of a document by the shock when the trailing edge of the document has passed an ante-reading roller is prevented to thereby prevent the misregister or distortion of a read image. More particularly, a document feeding apparatus for reading an image on a surface of a document to be read fed from an ante-reading roller, by an image reading carriage, and feeding the document to a downstream side by a delivery roller, the document feeding apparatus having a flat surface portion opposed to the image reading carriage, an upstream inclined portion disposed between the flat surface portion and the ante-reading roller and connected to the upstream side of the flat surface portion, a downstream inclined portion disposed between the flat surface portion and the delivery roller and connected to the downstream side of the flat surface portion, a reading guide for guiding a surface side opposite to the read surface of the document, a guide Mylar opposed to the reading guide and for guiding the read surface side of the document, and an auxiliary Mylar for holding the guide Mylar so that the guide Mylar may contact with the upstream inclined portion or the gap between the guide Mylar and the upstream inclined portion may become minute.

7 Claims, 9 Drawing Sheets

U.S. PATENT DOCUMENTS

| | | | | |
|---|---|---|---|---|
| 6,219,511 | B1 | 4/2001 | Okada | 399/203 |
| 6,512,602 | B1 | 1/2003 | Sheng et al. | 358/498 |
| 6,644,658 | B1 | 11/2003 | Sheng et al. | 271/264 |
| 6,877,742 | B1 * | 4/2005 | Nishikata et al. | 271/264 |
| 2001/0033761 | A1 | 10/2001 | Takida et al. | 399/367 |
| 2002/0081124 | A1 | 6/2002 | Kuwata et al. | 399/107 |

FOREIGN PATENT DOCUMENTS

| | | | | |
|---|---|---|---|---|
| JP | 10-236690 | | | 9/1998 |
| JP | 2000-201260 | | | 7/2000 |
| JP | 2000201260 | A | * | 7/2000 |
| JP | 2000-327168 | | | 11/2000 |

* cited by examiner

DOCUMENT FEEDING APPARATUS, IMAGE READING APPARATUS AND IMAGE FORMING APPARATUS

This is a divisional of U.S. patent application Ser. No. 10/347,874, filed on Jan. 22, 2003 now U.S. Pat. No. 6,877,742, and allowed on Sep. 28, 2004.

BACKGROUND OF THE INVENTION

1. Field of the Invention

The invention relates to a document feeding apparatus for feeding a document to a predetermined position, an image reading apparatus having the document feeding apparatus, and an image forming apparatus having the image reading apparatus.

2. Description of Related Art

In an image forming apparatus such as a digital copying machine, a printer or a FAX apparatus, there is known an auto document feeder (hereinafter referred to as the ADF) disposed on a document glass stand and designed to automatically feed a document to a reading position on the document glass stand to read the image information of the document. Because of the recent rapid digitization and due to the development of a high-speed digital copying machine by digital reading and memory mounting, and the mounting of the ADF onto a low-priced popular kind of machine, higher accuracy and higher speed image reading performance are required of the ADF as image input means for transferring an image to a personal computer or the like through a network.

As an ADF mounted on an image reading apparatus provided with two reading modes, i.e., an ADF mode in which the ADF is installed above a document glass stand and the flow reading of a document by the ADF is effected, and a book mode in which a document is set on the document glass stand and reading is effected with an optical system being moved, there is known one in which a document tray is disposed above a delivery tray and a document feed path leading from the document tray to the delivery tray past a reading position is constituted by a U-turn path to thereby decrease occupation space and achieve the downsizing of the apparatus.

An ADF of this type is provided with a transparent film member as a member for guiding the surface side of a document. As the advantages of this type, mention may be made of the following:

(1) Unlike a case where a member for guiding the outer side of a document is comprised of a plurality of members, a document can be transported smoothly from the upstream side of the reading position to the delivery tray via the reading position. Particularly, the shock when the leading edge of the document strikes against a delivery guide member for guiding the document from the reading position to the delivery tray can be mitigated.

(2) It is not necessary to provide a construction for scooping up the document from the reading position to the delivery guide member and therefore, there is not the necessity of providing an ADF reading position discretely from the image reading area of the book mode, and the further downsizing of the apparatus can be achieved by a simple construction.

FIG. 9 of the accompanying drawings shows the construction of an example of an ADF in which the document feed path is constituted by the U-turn path as described above and a transparent film member is used as a document surface side guide member. Also, FIG. 10 of the accompanying drawings is an enlarged cross-sectional view of the essential portions of the ADF, and FIG. 11 of the accompanying drawings is a cross-sectional view taken along line XI—XI in FIG. 10. It is to be understood that the ADF mentioned as an example is mounted on an image forming apparatus (not shown). This example of the conventional art will hereinafter be described with reference to FIGS. 9 to 11.

The reference numeral 1 designates a document tray, and the reference numeral 2 denotes a width regulation plate for regulating the side of a document. The reference numeral 3 designates a pick-up roller, which can be moved down to a position for contacting with the document (a position 3' on the upper surface of the document in FIG. 10). The reference numeral 4 denotes a separation roller, which is always in contact with a separation pad 5 opposed thereto and effects frictional separation to thereby feed the documents one by one. The reference numeral 6 designates a first feed roller, and the reference numeral 7 denotes a feed runner.

A separated document is fed along a feed path formed by an inner guide 10 and an outer guide 18 and downwardly curved and inclined, and is transported to a reading position Q via an ante-reading roller 11 and a reading pressure runner 12 as upstream feed means immediately before the reading position Q. A guide member near the reading position Q for guiding the backside (the side opposite to a read side) of the document is referred to as a reading guide 13. A Mylar guide 14 as a transparent sheet, which is a transparent film member, is mounted as means located on a side opposed to this reading guide 13 and for guiding the front side of the document. The Mylar guide 14 is a transparent plastic film comprising, for example, a PET material or the like, and is formed with a thickness of the order of 100 μm. A member restraining the Mylar guide 14 by a boss portion is referred to as a Mylar holder 19. The Mylar guide 14 has one end thereof restrained by the boss portion 19*a* of the Mylar holder 19 and has the other end thereof resting on a delivery guide 20 via a document glass stand 62.

The reading guide 13 is such that the surface thereof opposed to the reading position Q is formed by a flat surface portion 13*a* parallel to the document glass stand 62, and an upstream inclined portion 13*b* and a downstream inclined portion 13*c* connected to the flat surface portion 13*a* on the upstream side and downstream side thereof and being curved and inclined. Also, the reading guide 13 is mounted for pivotal movement about a pivotal fulcrum 13*d*, and is biased toward the document glass stand 62 by biasing means (not shown). Also, as shown in FIG. 11, hit projections 13*e* as projected members are provided on the opposite ends of the flat surface portion 13*a* in a direction orthogonal to a feeding direction, and the minute interval "d" with respect to the Mylar guide 14 is kept constant. Accordingly, the Mylar guide 14 is in contact with the document glass stand 62 near the reading position Q, and the image of the document is read through the Mylar guide 14 and the document glass stand 62.

The document having passed the reading position Q is transported along the Mylar guide 14 mounted on an upwardly inclined delivery guide 20, and is delivered onto a delivery tray 17 by a delivery roller 15 and a delivery pressure runner 16 as downstream feed means. That is, in this ADF, a feed path leading from the document tray 1 to the delivery tray 17 past the reading position Q is formed by a U-turn path.

In the ADF wherein the feed path is formed by a U-turn path as described above, there has been the problem that the document is fluttered by a shock at the moment when the trailing edge of the document being transported has passed between a pair of rollers immediately before the reading position and as the result, the defect of image such as misregister or image distortion is liable to occur to the read image. The mechanism of this will now be described with reference to FIG. 12 of the accompanying drawings.

FIG. 12 illustrates the state at the moment when the trailing edge of the document passes an ante-reading roller. The document P is transported so as to be along the upstream inclined portion 13*b* and downstream inclined portion 13*c* of the reading guide 13 when the document P is transported while being nipped between the ante-reading roller 11 and the delivery roller 15.

This is because in order to prevent slack or the like of the document being transported, the peripheral speed of the delivery roller 15 is generally set at a level about 1% higher than the peripheral speed of the ante-reading roller 11. When the trailing edge of the document P has passed the ante-reading roller 11, the document P so far transported along the upstream inclined portion 13*b* of the reading guide 11 tends to be restored to its original state by the stiffness of the document and therefore falls toward the Mylar guide 14. By this shock, the document is fluttered up and down. The influence of this fluttering extends to the document at the reading position and as a result, the defect of image such as misregister or distortion occurs to the read image.

Against such problem, as described in Japanese Utility Model Application Laid-Open No. 7-42258 (see FIG. 13 of the accompanying drawings), there is a construction in which a presser plate 118 for directly pressing a document against an inner guide with a resilient force is provided upstream of the reading position to thereby suppress the vibration or fluttering of the document and achieve the stable transport of the document at the reading position.

In the construction wherein the document is directly pressed, however, the shock at the moment when the trailing edge of the document has passed the ante-reading roller 11 can be alleviated, but the shock at the moment when the trailing edge of the document passes the presser plate 118 newly causes misregister or distortion.

SUMMARY OF THE INVENTION

The present invention solves such a problem peculiar to the conventional art and has as its object to prevent, in a document feeding apparatus, the vibration of a document due to the shock when the trailing edge of the document passes upstream feed means, by inexpensive and simple means, to thereby prevent the misregister or distortion of a read image.

The typical construction of the present invention for achieving the above object is a document feeding apparatus for reading an image on a surface of a document to be read fed from upstream feed means, by reading means, and feeding the document to a downstream side by downstream feed means, the document feeding apparatus having a flat surface portion opposed to the reading means, an upstream inclined portion disposed between the flat surface portion and the upstream feed means and connected to the upstream side of the flat surface portion, a downstream inclined portion disposed between the flat surface portion and the downstream feed means and connected to the downstream side of the flat surface portion, a guide member for guiding a surface side opposite to the read surface of the document, a transparent sheet opposed to the guide member and for guiding the read surface side of the document, and sheet holding means for holding the transparent sheet so that the transparent sheet may contact with the upstream inclined portion or the gap between the transparent sheet and the upstream inclined portion may become minute.

DETAILED DESCRIPTION OF THE PREFERRED EMBODIMENTS

Figure 1:
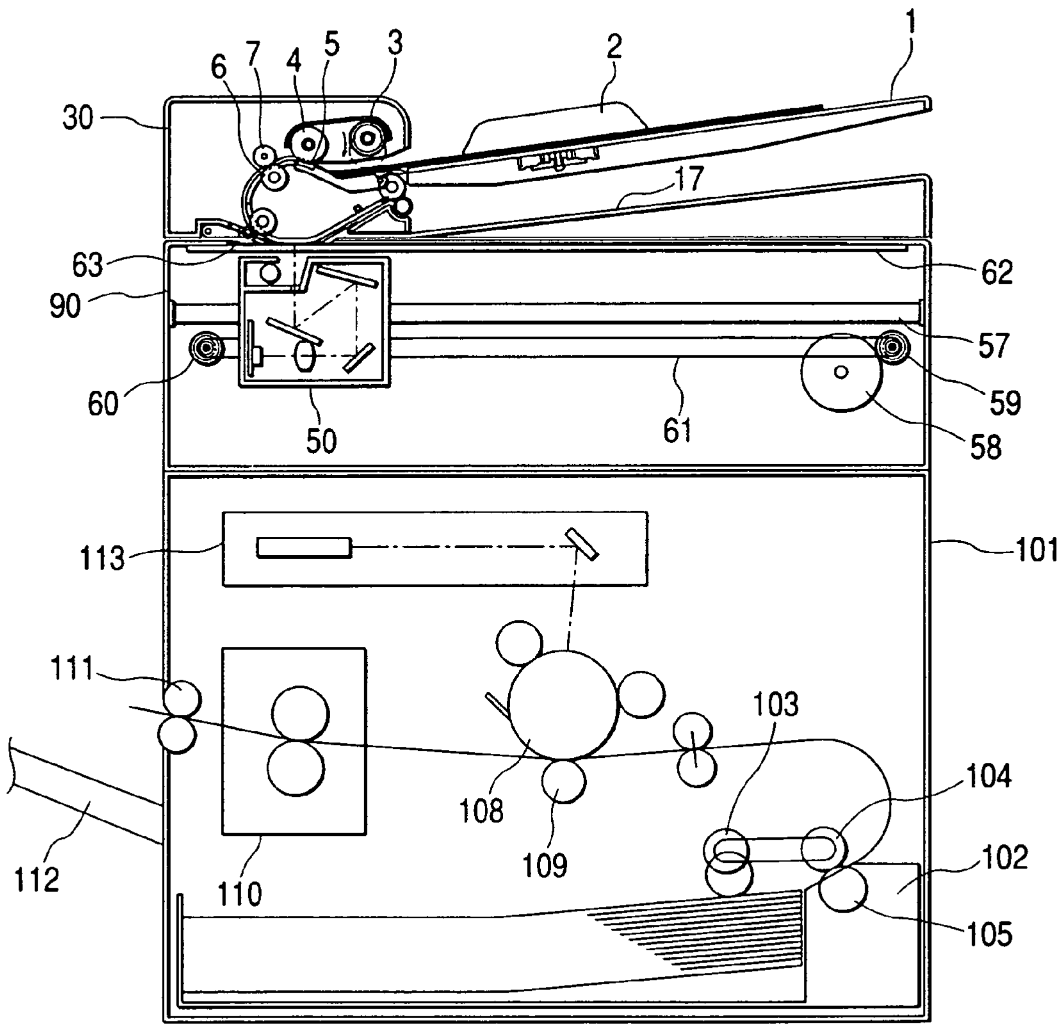
FIG. 1 illustrates the general construction of an image forming apparatus.
Figure 2:
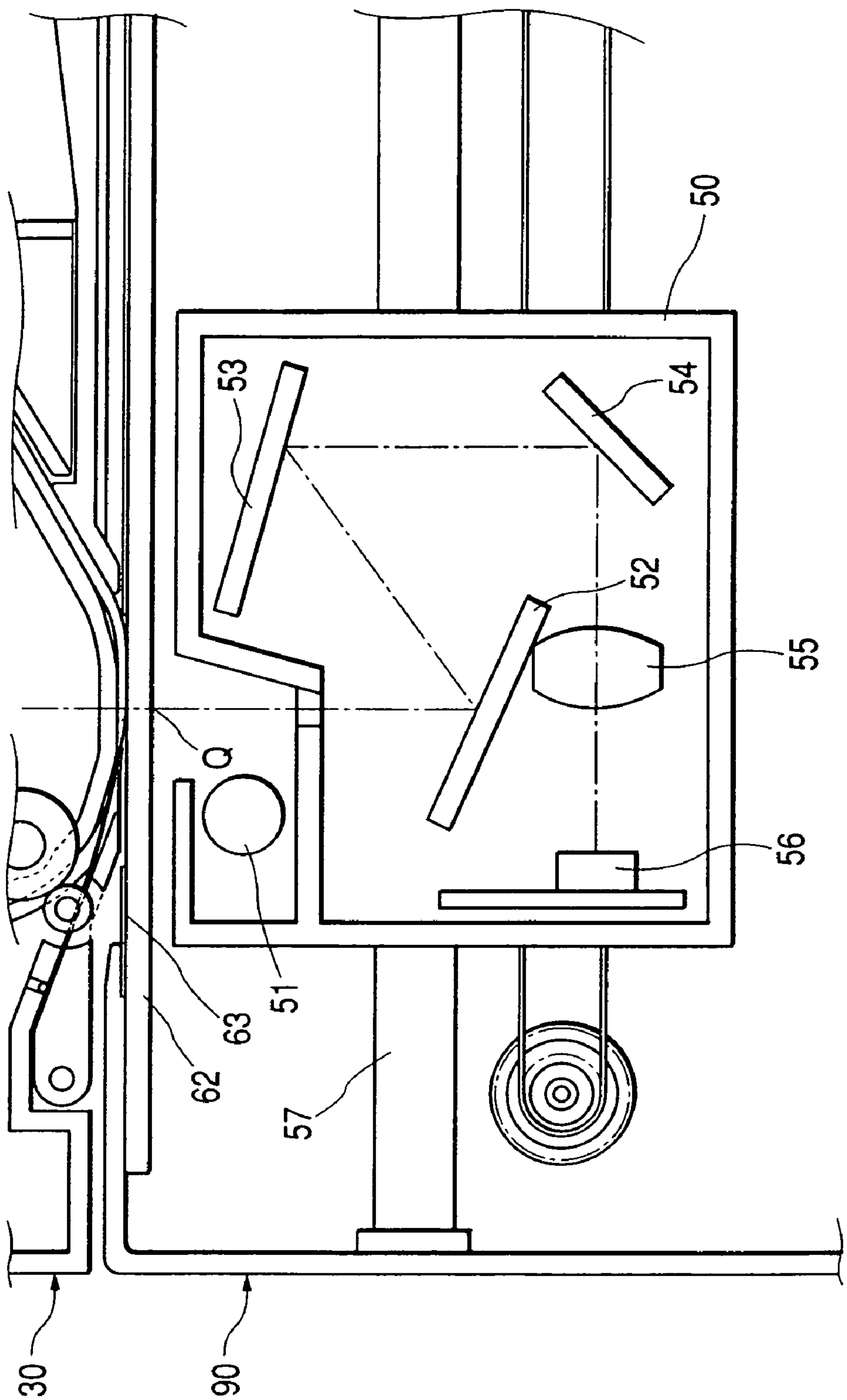
FIG. 2 is a cross-sectional view showing the essential portions of the image reading apparatus.

A first embodiment of the present invention will hereinafter be described with reference to the drawings. FIG. 1 illustrates the general construction of an image forming apparatus, and FIG. 2 is a cross-sectional view showing the essential portions of the image reading apparatus. The image forming apparatus having the document reading function will first be described with reference to FIG. 1. As the general construction, an image reading apparatus (hereinafter referred to as the scanner portion) 90 is placed on the image forming apparatus 101, and a document feeding apparatus (hereinafter referred to as the ADF portion) 30 is further mounted thereon.

The image forming apparatus 101 will first be briefly described. The reference numeral 113 designates a laser scanner for image writing, and an image read by the scanner portion 90 is image-processed, whereafter in conformity with a recording signal, a laser beam is applied to a photosensitive drum 108 as an image bearing member, whereby a latent image is formed on the image bearing member. Further, a toner image is formed by a toner supplied from a toner supplying device (not shown). The reference numeral 102 denotes a cassette containing recording media such as sheets of paper or sheet films.

In conformity with a recording signal, a recording medium is picked up from the cassette 102 by a pick-up roller 103, and is supplied to a position opposed to the photosensitive drum 108 by a feed roller 104 and a separation roller 105, and the toner image formed on the photosensitive drum 108 is transferred onto the recording medium by a transfer device 109. The recording medium onto which the toner image has been transferred is sent to a fixing device 110 and the toner image is fixed thereby. When images are to be formed on both sides of a recording medium, the recording medium having had the image thereon fixed by the fixing device 110 is delivered to a delivery tray 112 by delivery rollers 111 provided downstream of the fixing device 110.

The scanner portion 90 will now be described with reference to FIGS. 1 and 2. A document glass stand 62 (transparent plate) for reading a document flatly placed thereon is mounted on the upper surface of the scanner portion 90, and the ADF portion 30 is mounted openably and closably relative to the document glass stand 62 and performs the role as a document presser. The reference numeral 63 designates a document abutting reference during a book mode disposed on the document glass stand 62. An image reading carriage 50 as reading means is mounted on the scanner portion 90 for lateral movement along a guide shaft 57, and makes the flatly placed document scannable.

Drive is transmitted from a motor (not shown) to the image reading carriage 50 through a driving gear 58, driving pulleys 59, 60 and a driving belt 61. This image reading carriage 50, as shown in FIG. 2, carries thereon a lamp 51 for irradiating the document, reflecting mirrors 52, 53, 54, a lens 55 and a photoelectric conversion element 56. The image of the document irradiated by the lamp 51 is directed to the photoelectric conversion element 56 via the reflecting mirrors 52, 53, 54 and through the lens 55. When a document fed by the ADF is to be read, reading is effected with this image reading carriage 50 moved to and stopped at a predetermined reading position Q.

(First Embodiment)

Figure 3:
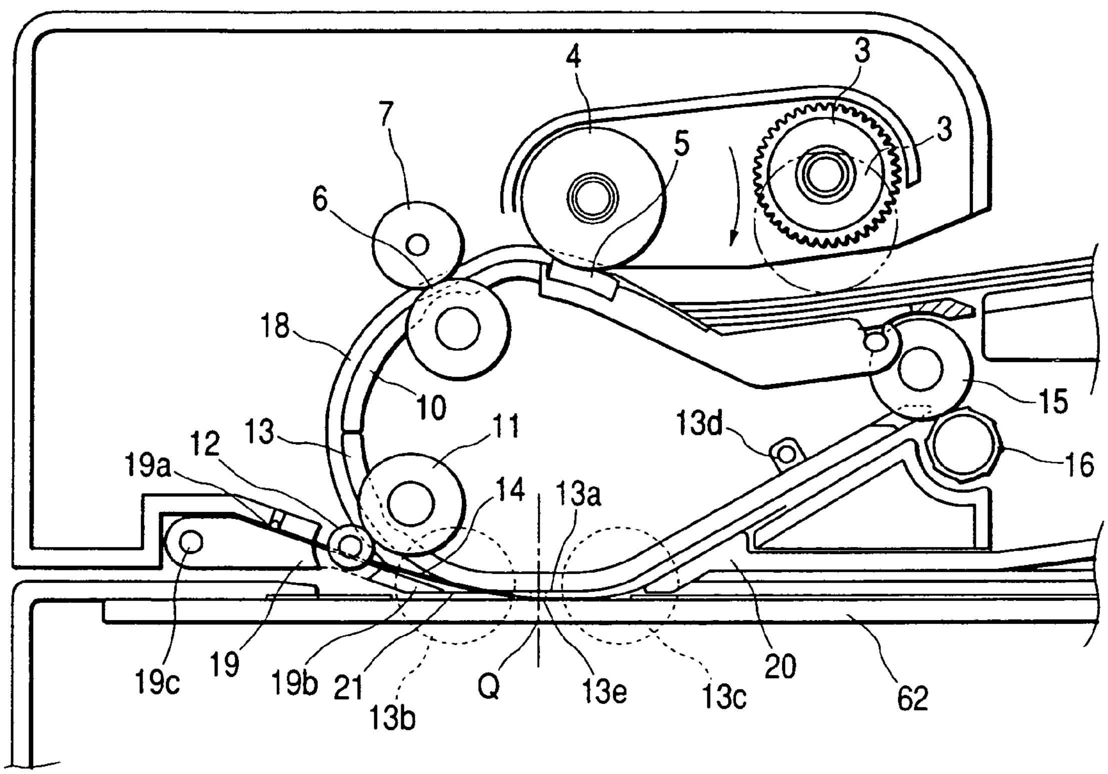
FIG. 3 is a cross-sectional view showing the essential portions of a document feeding apparatus (ADF) according to a first embodiment.
Figure 4:
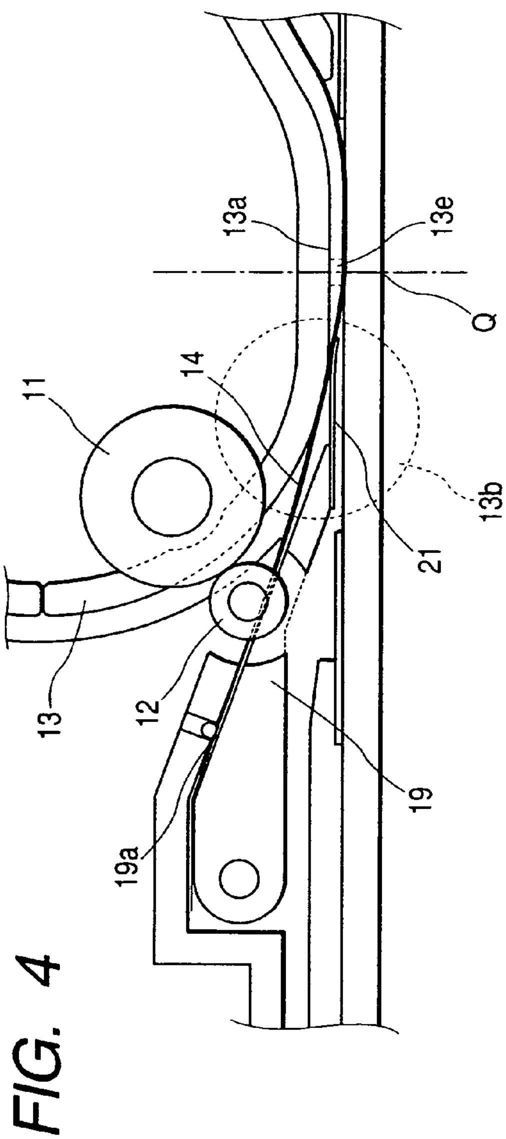
FIG. 4 is an enlarged view illustrating the construction of the first embodiment near a reading position.

The ADF portion 30 according to a first embodiment will now be described with reference to the drawings. FIG. 3 is a cross-sectional view showing the essential portions of the document feeding apparatus (ADF) according to the first embodiment, and FIG. 4 is an enlarged view illustrating the construction of the first embodiment near a reading position. In these figures, the same members or the functionally same members as those in the example of the conventional art are given the same reference characters and need not be described.

On a Mylar holder 19 according to the first embodiment, there is mounted a Mylar auxiliary member 21 as sheet holding means having one end thereof secured to a bottom surface 19*c* as by an adhesive double coated tape and having the other end thereof extended to the vicinity of the boundary between the flat surface portion 13*a* and upstream inclined portion 13*b* of a reading guide 13. The Mylar auxiliary member 21 is a sheet-like elastic member, and any plastic film can be used as the Mylar auxiliary member, and it is comprised of a thin sheet-like or otherwise shaped elastic member of, e.g., a polyethylene material.

As shown in FIG. 4, the Mylar auxiliary member 21 raises a Mylar guide 14 with an elastic force while being slightly bent, and near the most protruded portion of the upstream inclined portion 13*b* of the reading guide 13, the Mylar guide 14 lightly contacts with the reading guide 13. The Mylar auxiliary member 21 raises the Mylar guide 14 near the boundary between the upstream inclined portion 13*b* to the flat surface portion 13*a* of the reading guide 13. Since the Mylar guide 14 is raised so as to follow its raised position, the interyal thereof with respect to the reading guide 13 is narrowed with the range of the upstream inclined portion 13*b*. At this time, the Mylar guide 14 need not always contact with the reading guide 13, but the interyal between the Mylar guide 14 near the upstream inclined portion 13*b* and the reading guide 13 can be kept at the order of 100–200 μm. Also, the Mylar auxiliary member 21 extends in the cross-direction of a document, and raises the Mylar guide 14 with a predetermined push-up force over the width of the document.

Figure 5:
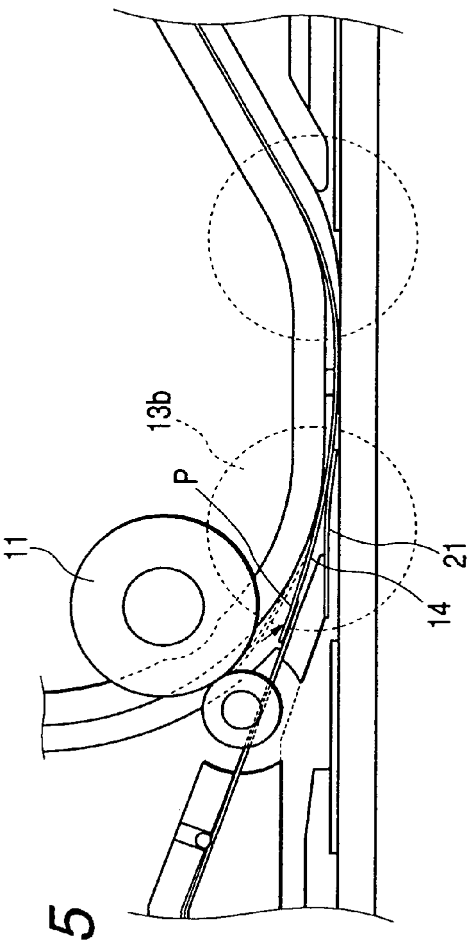
FIG. 5 is a schematic view illustrating the feeding state when the trailing edge of a document passes an ante-reading roller.

FIG. 5 is a schematic view illustrating the feeding state when the trailing edge of the document passes an ante-reading roller. When a document P is fed and passes the ante-reading roller 11, the document P is transported while depressing the Mylar guide 14 and the Mylar auxiliary member 21. If, at this time, the document is thin paper, it does not provide feed resistance, and if the document is thick paper, it is necessary to set the elastic force of the Mylar auxiliary member 21 so as not to widen a feed path too much. In the present embodiment, the basic weight of thin paper is considered to be about 60 g/m$^2$, and the basic weight of thick paper is considered to be about 110 g/m$^2$, and the thickness of the Mylar auxiliary member 21 is set to 200 μm, and the Mylar auxiliary member 21 raises the Mylar guide 14 with an elastic force of 30 to 40 g.

Accordingly, the document is fed while depressing the Mylar guide 14 in conformity with the basic weight thereof to thereby secure a necessary feed path, but the interval of the upstream inclined portion 13*b* with respect to the reading guide 13 is kept at a minute interval of 200 to 300 μm or less even if the document is thick paper. In this case, the Mylar guide 14 may be biased so as to sandwich the document P, but the urging force of the Mylar auxiliary member 21 is adjusted so as to bias the Mylar guide with a sufficiently small force so that thin paper may not provide feed resistance.

The document P is transported so as to be along the upstream inclined portion 13*b* of the reading guide 13 until the trailing edge of the document P passes the ante-reading roller 11 (broken line indicated in FIG. 5). When, from this state, the trailing edge of the document P passes the ante-reading roller 11, the trailing edge of the document P falls toward the Mylar guide 14, but the vertical fluttering of the document due to the shock of the fall can be suppressed because the interval between the reading guide 13 and the Mylar guide 14 near the upstream inclined portion 13*b* is minute. Accordingly, the shock when the trailing edge of the document has passed the ante-reading roller 11 can be prevented from reaching the document at the reading position Q. That is, as a result, the defect of image such as misregister or distortion can be prevented from occurring to a read image.

To suppress the fluttering of the document due to the shock with which the trailing edge of the document has passed the ante-reading roller, it is effective not to hold down the document at a point but to hold down the document at a range (area). As in the present embodiment, the Mylar guide 14 is disposed so as to follow even if the Mylar guide 14 is raised at a point and, therefore, the shock when the trailing edge of the document has passed the ante-reading roller can be absorbed by an inexpensive and easy construction.

(Second Embodiment)

Figure 6:
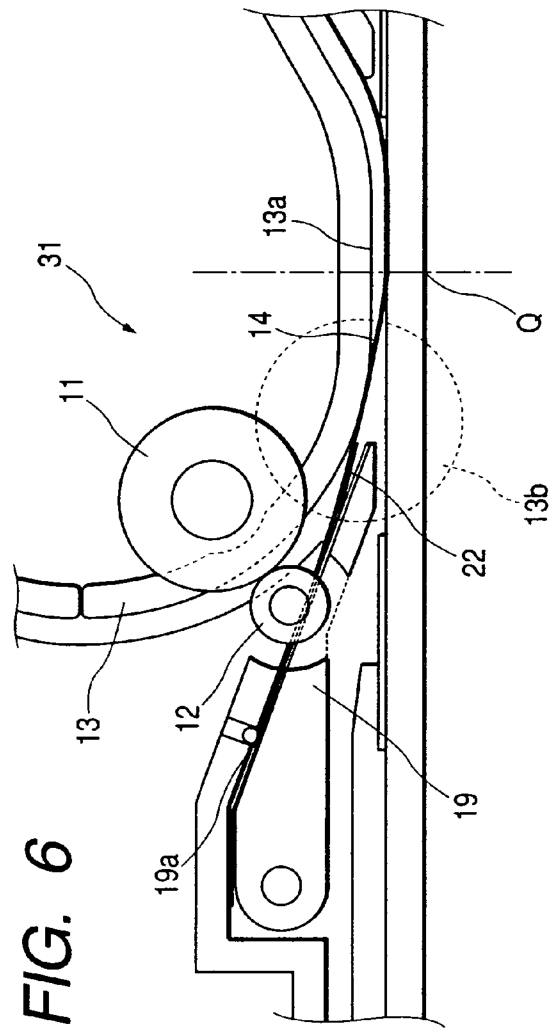
FIG. 6 is an enlarged view illustrating the construction of a second embodiment near a reading position.

A second embodiment of the present invention will now be described with reference to the drawings. Members similar to those in the aforedescribed embodiment are given the same reference characters and need not be described. FIG. 6 is an enlarged view illustrating the construction of the second embodiment near the reading position.

Figure 7:
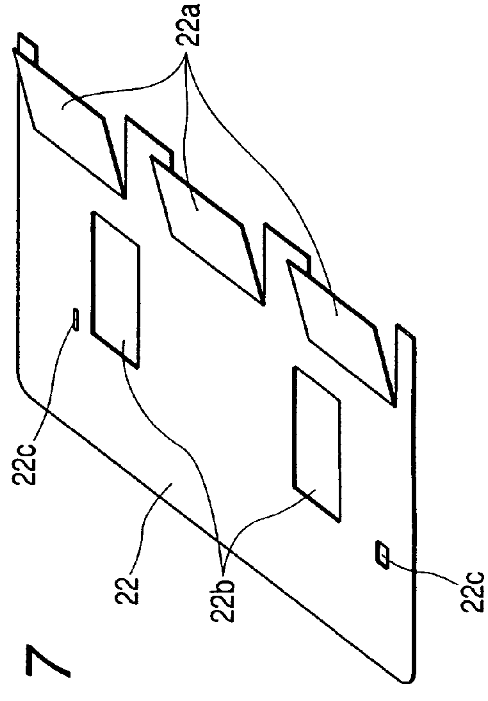
FIG. 7 is a perspective view illustrating a Mylar auxiliary member in the second embodiment.

An ADF portion 31 according to the second embodiment is provided with a Mylar auxiliary member 22 as sheet holding means disposed so as to overlap the Mylar guide 14, on the opposed side of the upstream inclined portion 13*b* of the reading guide 13. FIG. 7 is a perspective view illustrating the Mylar auxiliary member in the second embodiment. The reference character 22*b* designates escape apertures for reading pressure runners 12, and the reference character 22*c* denotes an aperture for fitting to the boss portion 19*a* of a Mylar holder 19. Also, three bent portions 22*a* are provided in the cross-direction of the document. The Mylar auxiliary member 22 is mounted on the Mylar holder 19 through the aperture 22*c* for fitting to the boss portion 19*a* of the Mylar holder 19, and the Mylar guide 14 is mounted thereon.

As shown in FIG. 6, the Mylar guide 14 is raised toward and mounted on the reading guide 13 by the bent portions 22*a* of the Mylar auxiliary member 22, and lightly contacts with the reading guide 13 at the most protruded portion of the upstream inclined portion 13*b*. As the Mylar auxiliary member 22, as in the first embodiment, any plastic film having an elastic property can be used, and it is constituted by a thin sheet-shaped or otherwise shaped elastic member of, e.g., a polyethylene material. That is, it differs from the first embodiment in the point at which it raises the Mylar guide 14, but as in the first embodiment, it raises the Mylar guide 14 with an elastic force and keeps the feed path near the upstream inclined portion 13*b* at a minute interval.

In the ADF portion 31 of the above-described construction, as in the first embodiment, the thickness and raising force of the Mylar auxiliary member 22 are adjusted so as not to provide feed resistance during the feeding of thin paper, and not to widen the feed path too much during the feeding of thick paper. Accordingly, like the effect obtained in the first embodiment, the shock when the trailing edge of the document has passed the ante-reading roller 11 is absorbed near the upstream inclined portion 13*b*, and the document at the reading position can be transported stably.

(Third Embodiment)

Figure 8:
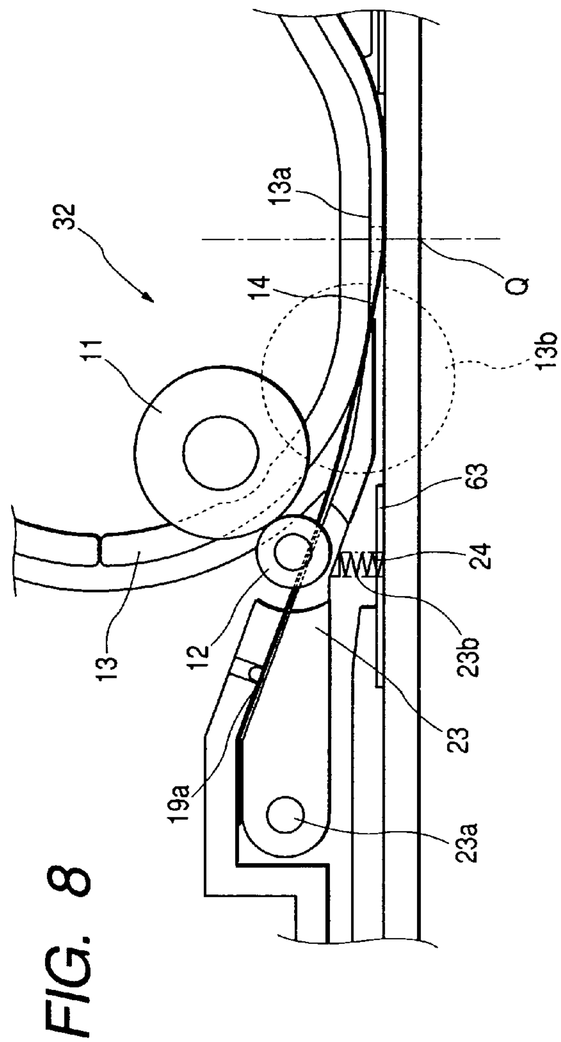
FIG. 8 is an enlarged view illustrating the construction of a third embodiment near a reading position.
Figure 9:
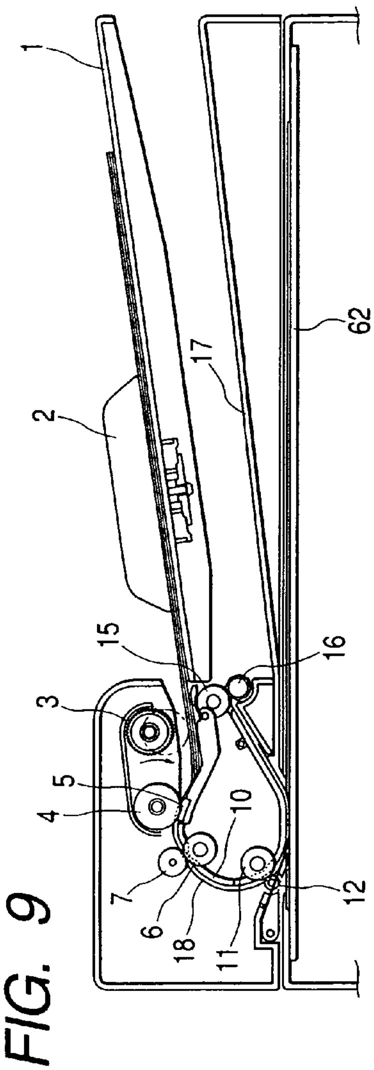
FIG. 9 shows the construction of an example of an ADF according to the conventional art.
Figure 10:
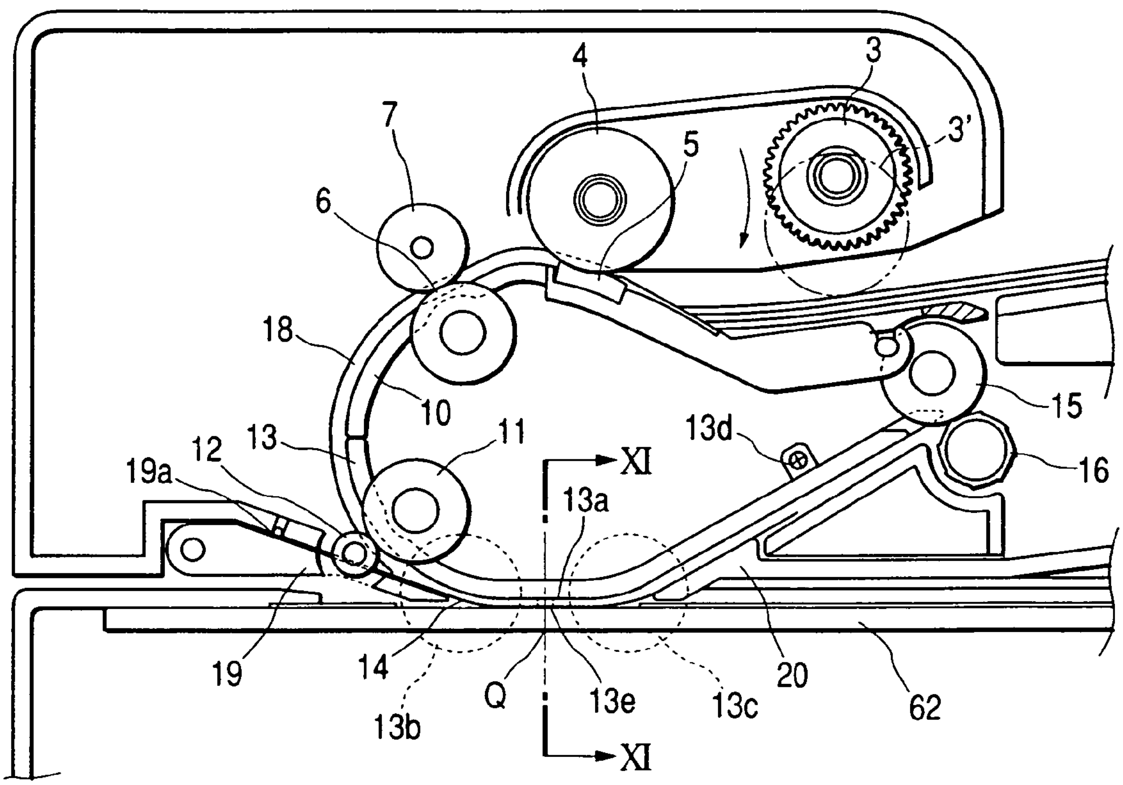
FIG. 10 is an enlarged cross-sectional view of the essential portions of the ADF according to the conventional art.
Figure 11:
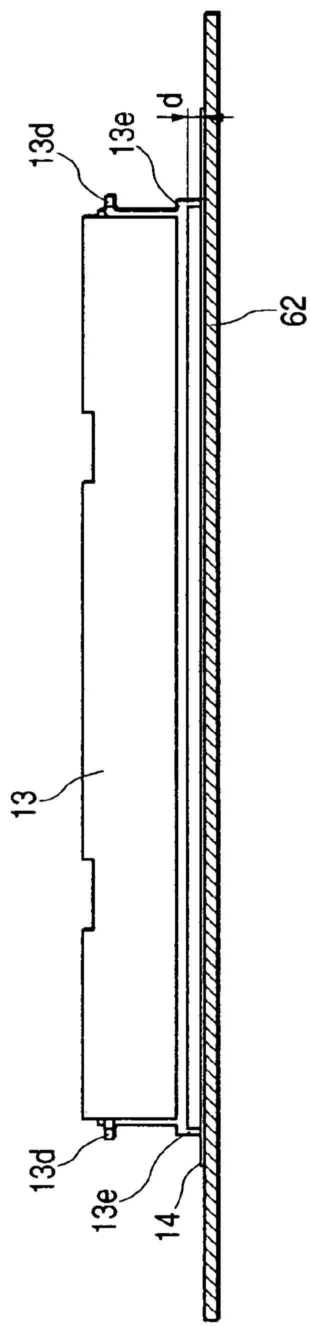
FIG. 11 is a cross-sectional view taken along line XI—XI in FIG. 10.
Figure 12:
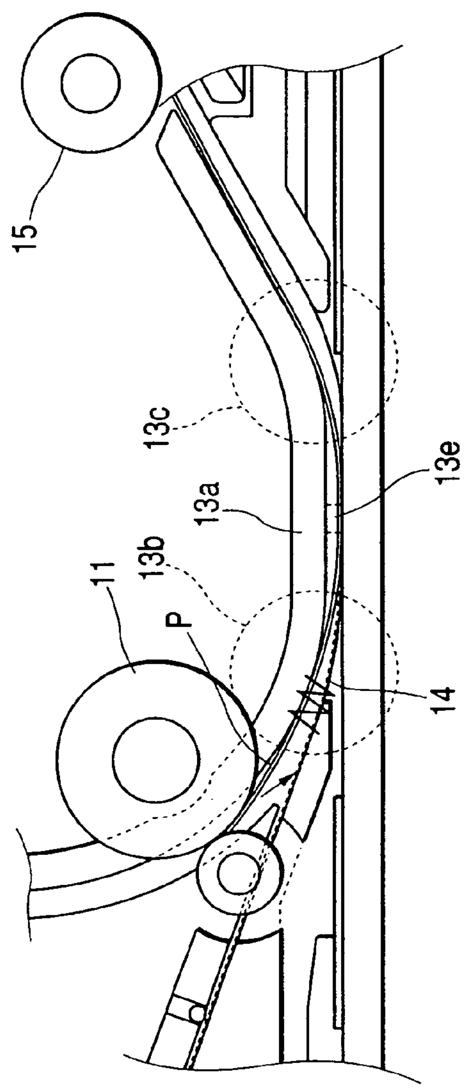
FIG. 12 illustrates the state at the moment when in the ADF according to the conventional art, the trailing edge of a document passes an ante-reading roller.
Figure 13:
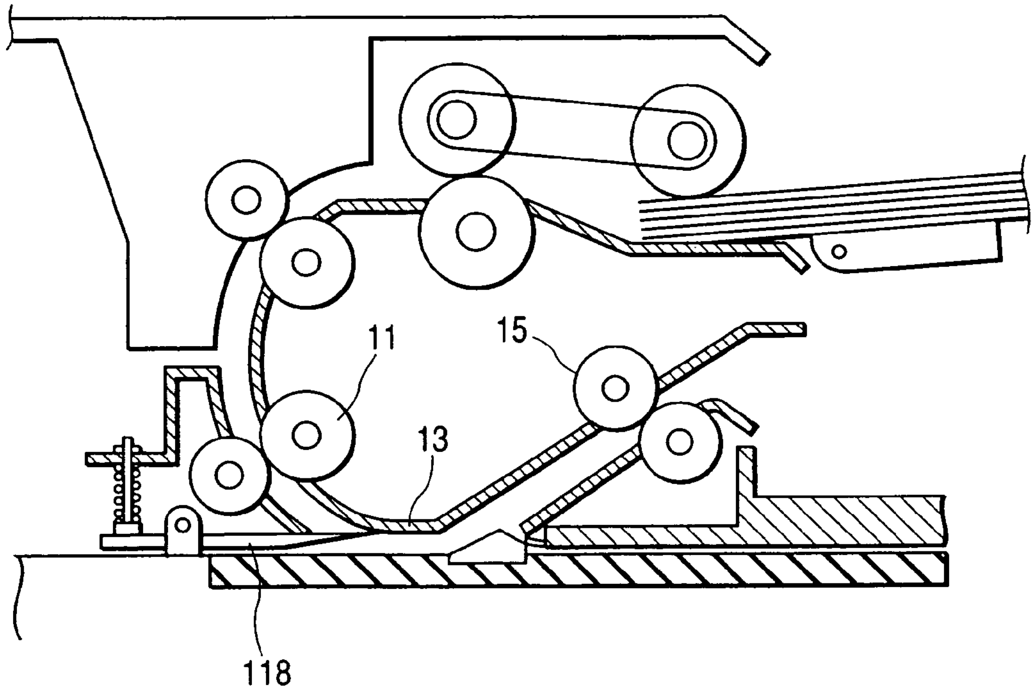
FIG. 13 is an illustration of a presser plate in the ADF according to the conventional art.

A third embodiment of the present invention will now be described with reference to the drawing. Members similar to those in the aforedescribed embodiments are given the same reference characters and need not be described. FIG. 8 is an enlarged view illustrating the construction of the third embodiment near the reading position.

In an ADF portion 32 according to the third embodiment, a Mylar holder 23 as resin molded sheet holding means having little or no elastic force in itself is extended to the vicinity of the boundary between the upstream inclined portion 13*b* and flat surface portion 13*a* of the reading guide 13.

As shown in FIG. 8, the Mylar holder 23 raises the Mylar guide 14, and, as in the first and second embodiments, it lightly contacts with the reading guide 13 at the most protruded portion of the upstream inclined portion 13*b*. The Mylar holder 23 is rotatably supported on the frame (not shown) of the ADF portion 32 by a pivotal fulcrum 23*a*. The boss portion 23*b* of the underside of the Mylar holder 23 abuts against a document abutting reference 63 during the book mode reading through a coil spring 24, and the Mylar holder 23 is raised toward the reading guide 13.

Accordingly, although the Mylar holder 23 (a non-elastic member) itself does not have an elastic force, it raises the Mylar guide 14 with an elastic force through the coil spring 24 as an elastic member, and keeps the feed path near the upstream inclined portion 13*b* at a minute interval. The spring pressure of the coil spring 24 is adjusted so as not to provide feed resistance during the feeding of this paper, and not to widen the feed path greatly during the feeding of thick paper. Accordingly, like the effect obtained in the first and second embodiments, the shock when the trailing edge of the document has passed the ante-reading roller 11 is absorbed near the upstream inclined portion 13*b*, and the document at the reading position can be transported stably. The means for applying an elastic force to the non-elastic member is not restricted to the construction of the present embodiment, but can be any construction in which a non-elastic member abuts against the Mylar guide 14 with an elastic force that raises the latter.

As described above, in the present invention, because of a construction having a flat surface portion opposed to reading means, an upstream inclined portion disposed between the flat surface portion and upstream feed means and connected to the upstream side of the flat surface portion, a downstream inclined portion disposed between the flat surface portion and downstream feed means and connected to the downstream side of the flat surface portion, a guide member for guiding a surface side opposite to the read surface of a document, a transparent sheet opposed to the guide member and for guiding the read surface side of the document, and sheet holding means for holding the transparent sheet so that the transparent sheet may contact with the upstream inclined portion or the gap between the transparent sheet and the upstream inclined portion may become minute, in a document feeding apparatus, the vibration of the document due to the shock when the trailing edge of the document has passed the upstream feed means can be prevented by inexpensive and simple means to thereby prevent the misregister or distortion of a read image.

What is claimed is:

1. A document feeding apparatus for feeding a document of which an image on a read surface is read by reading means, said document feeding apparatus comprising:

a feeding roller which feeds the document to the reading means;

a guide member for guiding a surface side opposite to the read surface of the document, wherein the guide member has a flat surface portion opposed to the reading means and an inclined portion disposed between the flat surface portion and the feeding roller and connected to an upstream side of the flat surface portion;

a transparent sheet opposed to the guide member and for guiding the read surface of the document; and an elastic member provided so as to interpose said transparent sheet between the inclined portion and said elastic member, wherein said elastic member abuts against a surface of said transparent sheet opposite to a surface of said transparent sheet opposed to the inclined portion so that said elastic member holds said transparent sheet to let said transparent sheet contact with the inclined portion or make a gap between said transparent sheet and the inclined portion minute.

2. A document feeding apparatus according to claim 1, wherein the elastic member is constituted by a sheet-shaped elastic member.

3. A document feeding apparatus according to claim 1, wherein the guide member is provided with a projected member abutting against the transparent sheet for keeping an interval between the reading means and the transparent sheet at a predetermined amount.

4. A document feeding apparatus according to claim 1, further comprising:

a downstream feeding roller provided on downstream side of the reading means, wherein the guide member has a downstream inclined portion disposed between the flat surface portion and the downstream feeding roller and connected to a downstream side of the flat surface portion.

5. An image reading apparatus comprising:

a reading means for reading an image on a surface of a document to be read fed by a document feeding apparatus, wherein the document feeding apparatus is a document feeding apparatus according to claim 1.

6. An image forming apparatus for forming a toner image on an image bearing member on the basis of image information of a document read by an image reading apparatus, and transferring the toner image to a recording medium to thereby form the image information, wherein the image reading apparatus is an image reading apparatus according to claim 5.

7. A document feeding apparatus for feeding a document of which an image on a read surface is read by reading means, said document feeding apparatus comprising:

a feeding roller which feeds the document to the reading means;

a guide member for guiding a surface side opposite to the read surface of the document, wherein the guide member has a flat surface portion opposed to the reading means and an upstream inclined portion disposed between the flat surface portion and the feeding roller and connected to an upstream side of the flat surface portion;

a transparent sheet opposed to the guide member and for guiding the read surface of the document; and sheet holding means for holding the transparent sheet so that the transparent sheet may contact with the upstream inclined portion or the gap between the transparent sheet and the upstream inclined portion may become minute, wherein the sheet holding means has a non-elastic member abutting against the transparent sheet, and an elastic member for biasing the non-elastic member toward the transparent sheet.

* * * * *

UNITED STATES PATENT AND TRADEMARK OFFICE

CERTIFICATE OF CORRECTION

PATENT NO. : 7,032,900 B2
APPLICATION NO. : 11/028559
DATED : April 25, 2006
INVENTOR(S) : Kazushi Nishikata et al.

It is certified that error appears in the above-identified patent and that said Letters Patent is hereby corrected as shown below:

COVER PAGE AT ITEM (56) RC: page 2, right-handed Col.
Foreign Patent Documents, “200201260 A” should read --2000-201260 A--.

COVER PAGE AT ITEM (30):
Foreign Application Priority Data, “jan. 31, 2002 (JP) ... 2002/022959” should read --Jan. 31, 2002 (JP) .... 2002-022959--.

COLUMN 5:
Line 47, “as” should be deleted.
Line 65, “interyal” should read --interval--.

COLUMN 6:
Line 1, “interyal” should read --interval--.

Signed and Sealed this

Thirteenth Day of March, 2007

JON W. DUDAS
*Director of the United States Patent and Trademark Office*